(12) United States Patent
König

(10) Patent No.: US 7,108,625 B2
(45) Date of Patent: Sep. 19, 2006

(54) SYSTEM FOR GENERATING A ROTATIONAL MOVEMENT OF A SHAFT

(75) Inventor: Bernhard König, Bobingen (DE)

(73) Assignee: Honeywell International Inc., Morristown, NJ (US)

( * ) Notice: Subject to any disclaimer, the term of this patent is extended or adjusted under 35 U.S.C. 154(b) by 189 days.

(21) Appl. No.: 10/849,687

(22) Filed: May 19, 2004

(65) Prior Publication Data

US 2004/0214677 A1 Oct. 28, 2004

Related U.S. Application Data

(63) Continuation of application No. PCT/EP02/12954, filed on Nov. 19, 2002.

(30) Foreign Application Priority Data

Nov. 21, 2001 (EP) ................................. 01127691

(51) Int. Cl.
*F16H 3/72* (2006.01)

(52) U.S. Cl. .............................................. 475/5; 475/7

(58) Field of Classification Search .................... 475/2, 475/4, 5, 7
See application file for complete search history.

(56) References Cited

U.S. PATENT DOCUMENTS 1,519,309 A 12/1924 Hummel
4,896,562 A * 1/1990 Wilkinson et al. ............. 475/3
4,898,582 A 2/1990 Faste .......................... 604/141
4,907,548 A 3/1990 Lee ........................ 123/56 AC
5,025,756 A 6/1991 Nye .......................... 123/18 R
5,087,228 A 2/1992 Johansson ..................... 475/88
5,171,946 A 12/1992 Shaner ...................... 200/61.4
5,673,665 A 10/1997 Kim ........................ 123/197.1
6,379,276 B1 * 4/2002 Cheng ............................ 475/4

FOREIGN PATENT DOCUMENTS

| DE | 875 128 | 4/1953 |
|---|---|---|
| DE | 200 12 242 U1 | 12/2000 |
| EP | 0 444 676 A1 | 9/1991 |
| EP | 0 913 600 A1 | 11/1997 |
| EP | 0 913 600 B1 | 11/1997 |
| FR | 2491806 | 3/1992 |
| GB | 339915 | 12/1930 |
| GB | 479398 | 2/1938 |
| GB | 610746 | 10/1948 |
| WO | WO 03/044394 A1 | 11/2002 |

* cited by examiner

*Primary Examiner*—Dirk Wright
(74) *Attorney, Agent, or Firm*—Kris T. Fredrick; Kermit D. Lopez; Luis M. Ortiz

(57) ABSTRACT

An apparatus for generating a rotational movement of a shaft with a first device for generating a rotational movement, driving a first drive path, and a second device for generating a rotational movement, driving a second drive path, at least one rotatable planet pinion being arranged on the shaft and the first drive path engaging with the planet pinion via an inner toothed wheel work of a ring gear and the second drive path engaging with the planet pinion via an outer toothed wheel work of a sun wheel.

20 Claims, 3 Drawing Sheets

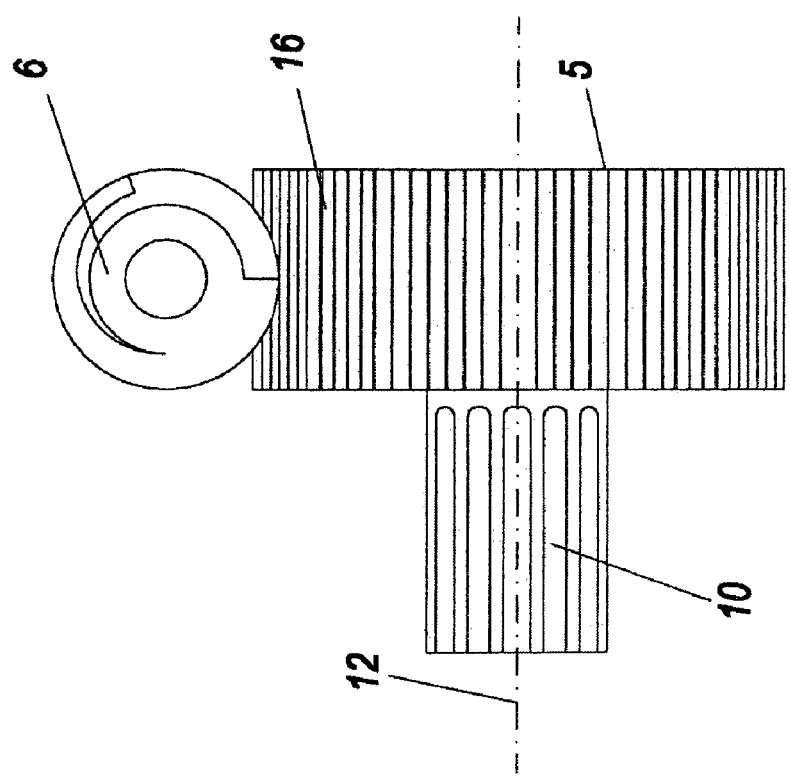
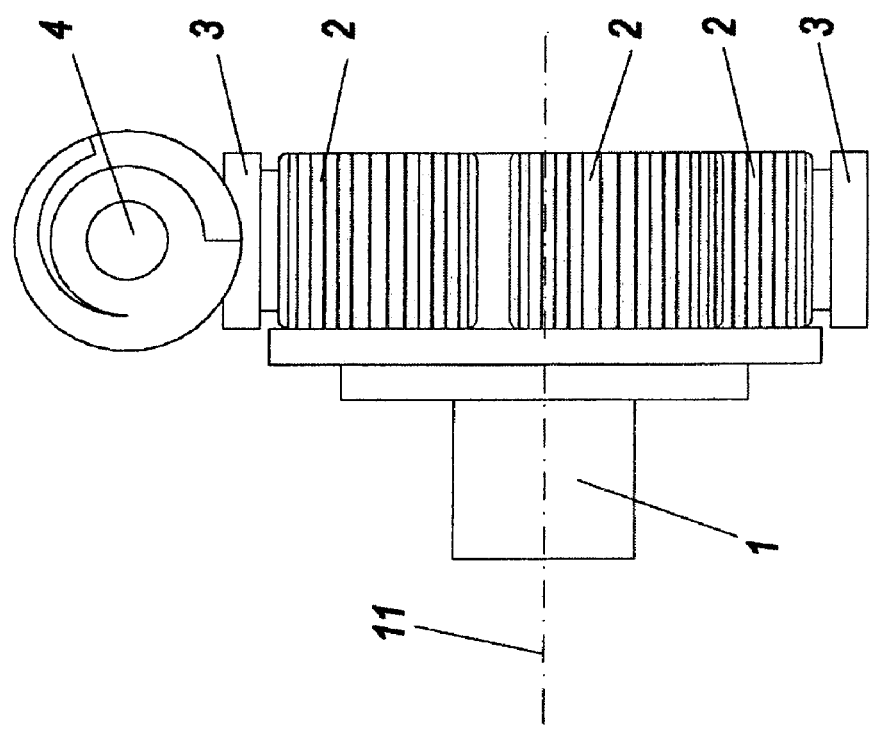

US 7,108,625 B2

SYSTEM FOR GENERATING A ROTATIONAL MOVEMENT OF A SHAFT

CROSS-REFERENCE TO RELATED APPLICATION

This patent application is a continuation of Patent Cooperation Treaty application, "System for Generating a Rotational Movement of a Shaft," filed on Nov. 19, 2002 as PCT/EPO2/12954, the entire content of which is hereby incorporated by reference and claims priority to European Patent Application Ser. No. 01127691.2, which was filed on Nov. 21, 2001.

TECHNICAL FIELD

Embodiments are generally related to devices and systems for generating the rotational movement of a shaft. Embodiments are also related to pinion, toothed wheel and sun wheel devices utilized in generating the rotational movement of a shaft. Embodiments are also related to motors and mechanical and electromechanical systems thereof.

BACKGROUND OF THE INVENTION

Conventional mechanical and electromechanical systems sometimes utilize rotational movement in association with drive path configurations. For example, European Patent No. EP 0 913 600 A1 discloses a system that sets a shaft in a rotational movement via several drive paths. The use of several drive paths driven independently of each other serves in this case essentially to create a redundancy of the overall drive system in order that, if one drive path fails, the shaft can continue to be rotated by the other remaining drive paths. Such so-called "redundant drives" have been implemented in association with increased safety requirements, such as in aircraft construction or the like. The disadvantage of conventional redundant drives is that as a rule such devices require a relatively large amount of space and possess a relatively high number of mobile parts.

In order to remove this disadvantage, it is already known to use planet pinion drives according to the preamble. Such drives are depicted, for example, in British Patent GB 610746 and U.S. Pat. No. 4,898,582. With such drives it is provided that when one drive path fails the other drive path remaining in each case can "take over" the rotation of the shaft. The remaining drive path can be started immediately after the other drive path has failed, without a coupling or the like having to be changed for this purpose. In both the named documents it is however still provided that only one of the two drive paths is operating while the other is at rest.

One conventional method of operation is disclosed in DE 20 012 242 U1. Here the torque is essentially transmitted by the second drive path to the shaft, while the first drive path is used merely to compensate for and correct an error in the speed or torque of the other drive path. The main load is thus permanently borne by the second drive path, while the first drive path is connected for correction purposes only when needed, but must then work at very different speeds. The disadvantage of the method of operation disclosed in DE 20 012 242 U1 is that the individual drive paths are loaded at very varying forces and also non-uniformly, which leads to a clear reduction of their life. However, this is precisely what is not desirable in the case of drives in which redundancy plays an important part.

BRIEF SUMMARY OF THE INVENTION

The following summary of the invention is provided to facilitate an understanding of some of the innovative features unique to the present invention and is not intended to be a full description. A full appreciation of the various aspects of the invention can be gained by taking the entire specification, claims, drawings, and abstract as a whole.

It is, therefore, one aspect of the present invention to provide a system for generating a rotational movement of a shaft.

It is another aspect of the present invention to provide for an improved speed regulating device.

The aforementioned aspects of the invention and other objectives and advantages can now be achieved as described herein. A speed regulating device is disclosed for coordinating the speed of the first device for generating a rotational movement with the speed of the second device for generating a rotational movement, the speed regulating device, during normal operation, setting speeds that are constant, but different from each other, of the first and second devices for generating a rotational movement.

Through the operation at speeds that are constant, but different from each other, of the two devices generating rotational movements of the first and the second drive path, the life of the devices generating rotational movement (as a rule, these are electric motors or combustion engines) is clearly increased. In addition, the result of using speeds that differ from one another is that the toothed wheels of the wheel work according to the preamble roll uniformly on one another and thus the wear on the toothed wheels in normal operation is particularly well minimized. The speed regulating device can be developed according to the invention in the form of a wheel work, but preferably as an electric or electronic regulating device. Whatever form it takes, it regulates the two devices for generating a rotational movement.

In order to also be able to continue to drive the apparatus with two devices for generating a rotational movement in the event of a wheel fracture in the area of the planet pinion or planet pinions, a more favorable variant provides that the speed regulating device operates the first and the second drive path in an operating variant differing from normal operation with no difference in speed. This prevents the apparatus from being completely blocked in the event of the mentioned wheel fracture, such as is the case in the state of the art. This in turn leads to an increase in the life and the redundancy of the apparatus.

A particularly favorable design variant provides that the imaginary axis of rotation of the ring gear of the first drive path is arranged coaxial to the shaft. In addition, it is also favorable that the imaginary axis of rotation of the sun wheel of the second drive path is arranged coaxial to the shaft. Through this coaxial alignment of the axes of rotation of the ring gear and/or of the sun wheel relative to the shaft a particularly simple, stable and compact arrangement of the two drive paths within the apparatus is in turn possible.

It is also favorable that several, preferably 5, rotatable planet pinions are arranged on the shaft. Through the use of several planet pinions the redundancy of the apparatus is further increased. This is because with the arrangement of several planet pinions the individual planet pinion must absorb fewer forces and above all when one planet pinion fails e.g. because of a fracture or the like the remaining residual load spreads better over several planet pinions. It is again favorable that an odd number of planet pinions provides on the one hand an improved smoothness of running and on the other a particularly favorable distribution of forces within the overall drive mechanism.

It is particularly favorable that all the planet pinions engage both with the ring gear of the first drive path and with the sun wheel of the second drive path. In this way, both an optimal redundancy in the event of the failure of a drive or of a planet pinion, and a particularly compact structure, are guaranteed.

A particularly preferred variant provides that the first device for generating a rotational movement drives the ring gear of the first drive path via a preferably self-arresting worm shaft. It is also favorable to provide that the second device for generating a rotational movement drives the sun wheel of the second drive path via a preferably self-arresting worm shaft. Through the use of worm shafts for the transmission of the rotational movement to the respective drive paths it is ensured that if one of the two drive paths fails the sun wheel or the ring gear are automatically arrested. This is particularly favorable, as the use of worm shafts for arresting means that no special brakes, clamps or the like whatever are needed, which in turn increases the operational reliability of the whole apparatus and represents a solution that is simple in design terms. In addition, the apparatus can thereby be built particularly small, as no space is to be provided for separate brakes, clamps or the like.

In principle, different devices for generating a rotational movement can be used. Particularly favorable versions provide in this case that the first and/or the second device for generating a rotational movement [is] an electric motor and/or a combustion engine. The choice of the respective device for generating a rotational movement depends on the intended use of the apparatus.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

FIG. 2 illustrates a representation of a detail of the first drive path in a side view, in accordance with a preferred embodiment;

FIG. 3 illustrates a representation of a detail of the second drive path in a side view, in accordance with a preferred embodiment.

DETAILED DESCRIPTION OF THE INVENTION

The particular values and configurations discussed in these non-limiting examples can be varied and are cited merely to illustrate at least one embodiment of the present invention and are not intended to limit the scope of the invention.

Figure 1:
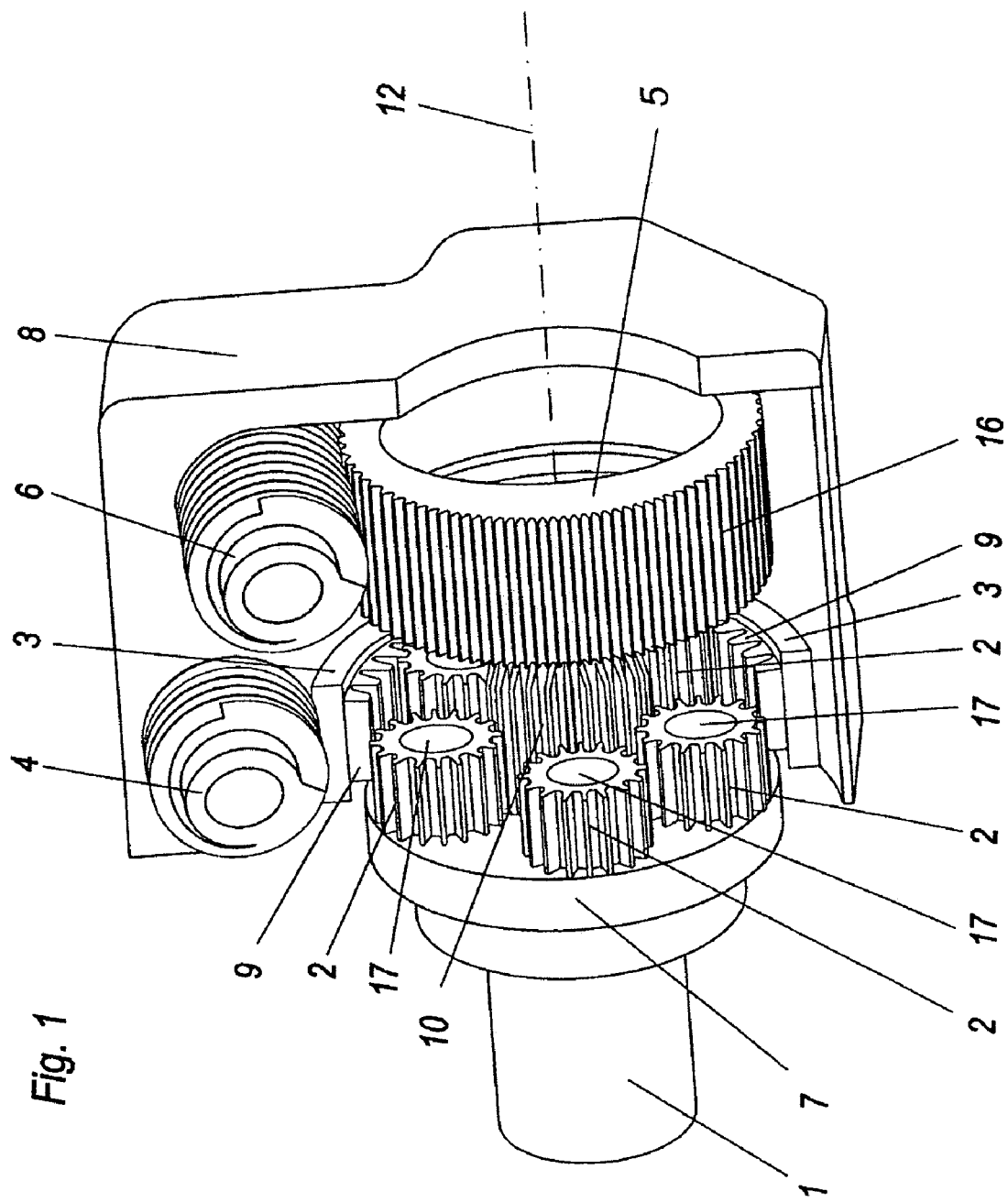
FIG. 1 illustrates a pictorial diagram of a wheel work in a perspective view with cut-open casing, in accordance with a preferred embodiment.
Figure 4:
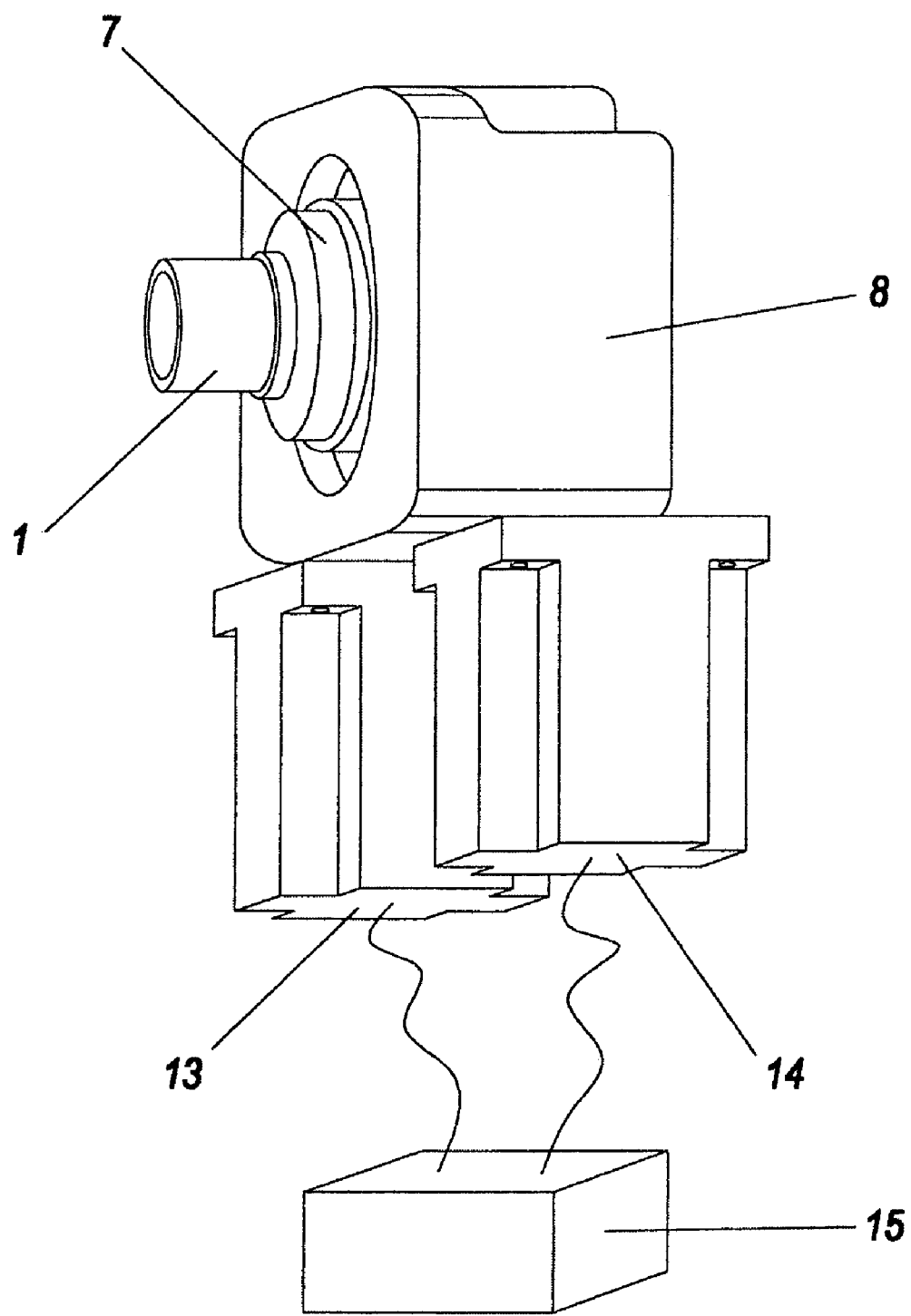
FIG. 4 illustrates a pictorial diagram of the configuration depicted in FIG. 1, including a closed casing, two electric motors fitted thereon and a speed regulating device, in accordance with a preferred embodiment.

In the version represented in FIG. 1, there are arranged inside a casing 8, which here is represented cut open, a first and a second drive path, these serving to generate a rotational movement of the shaft 1. A first device 13 for generating a rotational movement, which is not represented in more detail in FIG. 1, preferably directly drives the first drive path. This first drive path consists of the worm shaft 4 and the ring gear 3. The first device 13 for generating a rotational movement (an electric motor here) rotates the worm shaft 4.

The rotational movement of the worm shaft 4 effects, via a thread arranged outside in the ring gear, a rotational movement of the ring gear 3 about its imaginary axis of rotation 11. The ring gear 3 also has an inner toothed wheel work 9 which engages with the outer toothed wheel work of the planet pinions 2, with the result that the rotational movement of the first device 13 for generating a rotational movement is transmitted via the first drive path in such a way that it results in a rotational movement of the planet pinions 2. In FIG. 2 the first drive path is represented once again in a side view.

The second device 14 for generating a rotational movement drives the second drive path represented in a side view in FIG. 3. This in turn has a worm shaft 6 which engages with an outer worm toothed wheel work 16 of the sun wheel 5. The rotational movement generated by the device 14 for generating a rotational movement (e.g. likewise an electric motor) is preferably transmitted direct via the worm shaft 6 to the sun wheel 5, and thus leads to a rotational movement of the sun wheel 5 about its imaginary axis of rotation 12.

This rotational movement is in turn transmitted via the outer toothed wheel work 10 to the planet pinions 2 engaging with this outer toothed wheel work 10. The axes 17 of the plant pinions 2 are secured stationary on a base plate 7 which in turn is rigidly connected to the shaft 1 to be driven. The planet pinions 2 can each carry out a rotation about their axes 17 and also rotate with the shaft about its axis of rotation. The ring gear 3 and the planet pinion 6 are arranged in such a way that their imaginary axes of rotation 11 and 12 coincide with the axis of rotation of the shaft 1.

In normal operation a rotational movement is transmitted to the shaft 1 both via the first and via the second drive path. The electric motor 13 drives the worm shaft 4 and the ring gear 3, while the rotational movement generated by the electric motor 14 is transmitted to the sun wheel 5 via the worm shaft 6. These two rotational movements are transmitted via the outer toothed wheel work 10 of the sun wheel 5 and via the inner toothed wheel work 9 of the ring gear 3 to the planet pinions 2.

Via an odd number (e.g., five) of planet pinions, the wheel work becomes a planet wheel work at this point. The off-drive onto the shaft 1 takes place in this case via the base plate 7, developed as a star wheel, on which the axes 17 of the planet pinions 2 are arranged, the ultimate outcome being a rotational movement of the shaft 1. Through different speeds at the ring gear 3 and at the sun wheel 5, a rolling-off of the planet pinions 2 takes place in order to guarantee a uniform loading of the planet pinions 2.

The use of the worm shafts 4 and 6 is particularly favorable in this case, as these are self-locking or self-arresting. Through them, end-positions can be held without additional brakes or clamps when the first device 13 or second device 14 for generating a rotational movement is at a standstill.

If the first drive path fails, the ring gear 3 is arrested via the self-locking properties of the worm drive formed from worm shaft 4 and outer toothed wheel work of the ring gear 3 and assumes the function of a fixed outer wheel of a normal planet wheel work. The second drive path drives the planet pinions 2 via the worm shaft 6 and the sun wheel 5, the planet pinions 2 rolling via the ring gear 3 and thus transmitting a torque to the shaft 1.

If the drive path 2 fails, the sun wheel 5 is arrested via the worm shaft 2 by means of its self-locking action and thereby assumes the function of a fixed sun wheel of a fixed sun wheel of a normal planet wheel work. The ring gear 3 is driven via the drive path 1. The planet pinions 2 are set in a rotational movement via the ring gear 3 and roll off via the sun wheel 5, whereby a rotational movement is in turn transmitted to the shaft 1. In the event of a wheel fracture in the area of the planet pinions 3, it is provided that the first and the second drive path, without speed difference, transmit the torque to the shaft 1 via the remaining engaged toothed wheels.

In addition, a function test of the motors 13 and 14 can still be carried out by changing the direction of rotation on one path, so that as a result no rotation of the shaft 1 takes place. The procedure for regulating the speeds of the first device 13 for generating a rotational movement and the second device 14 for generating a rotational movement takes place according to the invention by means of the speed regulating device 15. In this case, both mechanical wheel works known in the state of the art and electric or electronic control or regulating devices known in the state of the art can be used as speed regulating device 15.

By way of a slight deviation from the embodiment represented in FIGS. 1 to 4, it can also be provided that the shaft 1 is used together with one of the drive paths (first or second) for driving and the other drive path as off-drive. It is important in this case, however, that the shaft 1 is driven via a self-arresting worm shaft, while no worm shaft is arranged in the drive path (first or second) used for the off-drive, as this would block the off-drive. The alternative design and operation variants can be realized with both the first and the second drive path as off-drive.

In addition to other design variants of the apparatus according to the invention, it must be mentioned in particular that modifications of the apparatus shown in FIGS. 1 to 4 are possible, with the result that more than two drive paths can also be used according to the invention for the generation of a rotational movement of the shaft 1. In this case, series connections and parallel connections of slightly modified variants of the apparatus shown in FIGS. 1 to 4 are conceivable in particular.

The embodiments and examples set forth herein are presented to best explain the present invention and its practical application and to thereby enable those skilled in the art to make and utilize the invention. Those skilled in the art, however, will recognize that the foregoing description and examples have been presented for the purpose of illustration and example only. Other variations and modifications of the present invention will be apparent to those of skill in the art, and it is the intent of the appended claims that such variations and modifications be covered.

The description as set forth is not intended to be exhaustive or to limit the scope of the invention. Many modifications and variations are possible in light of the above teaching without departing from the scope of the following claims. It is contemplated that the use of the present invention can involve components having different characteristics. It is intended that the scope of the present invention be defined by the claims appended hereto, giving full cognizance to equivalents in all respects.

What is claimed is:

1. An apparatus for generating a rotational movement of a shaft, comprising:
   a first device for generating a rotational movement, wherein said first device drives a first drive path and a second device for generating a rotational movement, wherein said second drive drives a second drive path;
   at least one rotatable planet pinion arranged on the shaft, wherein the first drive path engages with the planet pinion via an inner toothed wheel work of a ring gear and the second drive path engages with the planet pinion via an outer toothed wheel work of a sun wheel; and
   a speed regulating device for coordinating the speed of the first device for generating a rotational movement with the speed of the second device for generating a rotational movement, wherein the speed regulating device, during normal operation, sets speeds that are constant, but different from each other, of the first and second devices for generating a rotational movement.

2. The apparatus of claim 1 wherein the speed regulating device operates the first and the second drive path without speed difference in an operating variant deviating from normal operation.

3. The apparatus of claim 1 wherein an imaginary axis of rotation of the ring gear of the first drive path is arranged coaxial to the shaft.

4. The apparatus of claim 1 wherein an imaginary axis of rotation of the sun wheel of the second drive path is arranged coaxial to the shaft.

5. The apparatus of claim 1 wherein a plurality of rotatable planet pinions are arranged on the shaft.

6. The apparatus of claim 1 wherein five rotatable planet pinions are arranged on the shaft.

7. The apparatus of claim 1 wherein an odd number of rotatable planet pinions are arranged on the shaft.

8. The apparatus of claim 1 wherein said at least one rotatable planet pinion engages both with the ring gear of the first drive path and with the sun wheel of the second drive path.

9. The apparatus of claim 1 wherein the first device for generating a rotational movement drives the ring gear of the first drive path via a self-arresting worm shaft.

10. The apparatus of claim 1 wherein the second device for generating a rotational movement drives the sun wheel of the second drive path via a self-arresting worm shaft.

11. The apparatus of claim 1 wherein the first and the second device for generating a rotational movement comprises an electric motor.

12. The apparatus of claim 1 wherein the first and the second device for generating a rotational movement comprises a combustion engine.

13. An apparatus for generating a rotational movement of a shaft, comprising:
   a first device for generating a rotational movement, wherein said first device drives a first drive path and a second device for generating a rotational movement, wherein said second drive drives a second drive path, wherein the first and the second device for generating a rotational movement comprises a combustion engine;
   at least one rotatable planet pinion arranged on the shaft, wherein the first drive path engages with the planet pinion via an inner toothed wheel work of a ring gear and the second drive path engages with the planet pinion via an outer toothed wheel work of a sun wheel; and
   a speed regulating device for coordinating the speed of the first device for generating a rotational movement with the speed of the second device for generating a rotational movement, wherein the speed regulating device, during normal operation, sets speeds that are constant, but different from each other, of the first and second devices for generating a rotational movement, wherein the speed regulating device operates the first and the second drive path without speed difference in an operating variant deviating from normal operation and wherein an imaginary axis of rotation of the ring gear of the first drive path is arranged coaxial to the shaft.

14. The apparatus of claim 13 wherein the first device for generating a rotational movement drives the ring gear of the first drive path via a self-arresting worm shaft.

15. The apparatus of claim 13 wherein the second device for generating a rotational movement drives the sun wheel of the second drive path via a self-arresting worm shaft.

16. An apparatus for generating a rotational movement of a shaft, comprising:
  a first device for generating a rotational movement, wherein said first device drives a first drive path and a second device for generating a rotational movement, wherein said second drive drives a second drive path;
  at least one rotatable planet pinion arranged on the shaft, wherein the first drive path engages with the planet pinion via an inner toothed wheel work of a ring gear and the second drive path engages with the planet pinion via an outer toothed wheel work of a sun wheel; and
  a speed regulating device for coordinating the speed of the first device for generating a rotational movement with the speed of the second device for generating a rotational movement, wherein the speed regulating device, during normal operation, sets speeds that are constant, but different from each other, of the first and second devices for generating a rotational movement, wherein the speed regulating device operates the first and the second drive path without speed difference in an operating variant deviating from normal operation and wherein an imaginary axis of rotation of the sun wheel of the second drive path is arranged coaxial to the shaft, such that the second device for generating a rotational movement drives the sun wheel of the second drive path via a self-arresting worm shaft.

17. The apparatus of claim 16 wherein five rotatable planet pinions are arranged on the shaft.

18. The apparatus of claim 16 wherein an odd number of rotatable planet pinions are arranged on the shaft.

19. The apparatus of claim 16 wherein the first and the second device for generating a rotational movement comprises an electric motor.

20. The apparatus of claim 16 wherein the first and the second device for generating a rotational movement comprises a combustion engine.

* * * * *